US005405908A

United States Patent [19]

Takahashi et al.

[11] Patent Number: 5,405,908

[45] Date of Patent: Apr. 11, 1995

[54] ACRYLIC RUBBER COMPOSITION

[75] Inventors: Masaharu Takahashi; Naoki Omura, both of Gunma, Japan

[73] Assignee: Shin-Etsu Chemical Co., Ltd., Tokyo, Japan

[21] Appl. No.: 178,972

[22] Filed: Jan. 7, 1994

[30] Foreign Application Priority Data

Jan. 8, 1993 [JP] Japan .................................. 5-017944

[51] Int. Cl.[6] .................................................. C08K 3/34

[52] U.S. Cl. ..................................... 524/493; 524/496; 524/268; 524/588

[58] Field of Search ............... 524/588, 266, 268, 493, 524/496

[56] References Cited

U.S. PATENT DOCUMENTS 4,742,101 5/1988 Yoshida ............................... 524/268

5,134,170 7/1992 Shata et al. ......................... 525/199

*Primary Examiner*—John C. Bleutge

*Assistant Examiner*—Mark D. Sweet

*Attorney, Agent, or Firm*—Millen, White, Zelano, & Branigan

[57] ABSTRACT

An improvement is proposed for an acrylic rubber composition to decrease the stickiness of the rubber composition under processing and shaped and vulcanized articles of the composition to a metallic surface with which the rubber article is kept in contact at an elevated temperature under compression as is the case in packings, gaskets and O-rings as automobile parts. The improvement can be obtained by compounding the rubber composition consisting of an acrylic rubbery polymer, which can be substituted by organosilicon groups, and a reinforcing filler with a limited amount of a specific diorganopolysiloxane, e.g., dimethyl polysiloxane, of which from 5 to 50% in number of the organic groups bonded to the silicon atoms are phenyl groups.

8 Claims, No Drawings

ACRYLIC RUBBER COMPOSITION

BACKGROUND OF THE INVENTION

The present invention relates to a novel acrylic rubber composition as well as to a cured product or vulcanizate thereof. More particularly, the invention relates to an improved acrylic rubber composition having excellent workability in processing and vulcanization and capable of giving a vulcanized rubber article which is outstandingly free from the troubles due to sticking to the surface of a metallic body with which the rubber articles is kept in contact at an elevated temperature under pressure. Thus the compositions are useful as a material of rubber packings, gaskets, O-rings and the like used as automobile parts as compared with conventional acrylic rubber compositions.

As is known, acrylic rubbers have excellent heat resistance and oil resistance so that they are widely used as a material for rubber-made parts in automobiles. It is a trend in recent years that the applications of acrylic rubbers as a material of automobile parts such as, for example, packings, gaskets and O-rings of oil filters are rapidly expanding. Acrylic rubbers in general, however, are not without problems and disadvantages. One of the disadvantages in the acrylic rubbers is that the workability of acrylic rubber compositions is relatively poor because of the problem of heavy sticking to the surface of the milling rollers and other rubber-processing machines to cause a great decrease in the productivity. In addition, shaped and vulcanized articles of an acrylic rubber composition are also not free from the problem of sticking to the surface of a body with which the rubber article has been kept in contact at an elevated temperature under pressure as is the case with rubber packings, gaskets and O-rings so that a great difficulty is sometimes encountered in replacing rubber parts in automobile maintenance.

SUMMARY OF THE INVENTION

The present invention accordingly has an object to provide a novel and improved acrylic rubber composition having excellent workability in rubber processing without the troubles of sticking to the surface of rollers and other rubber processing machines and capable of giving a shaped and vulcanized rubber article free from the disadvantageous phenomenon of sticking to the surface of a metallic body when prolongedly kept in contact therewith at an elevated temperature under pressure.

The acrylic rubber composition in a first embodiment of the invention comprises, as a uniform blend:

(a) 100 parts by weight of an acrylic rubbery polymer which is a homopolymer of one kind or copolymer of two kinds or more of (meth)acrylic acid esters represented by the general formula $$CH_2{=}CR^1{-}CO{-}O{-}R^2, \quad (1)$$

in which $R^1$ is a hydrogen atom or a methyl group and $R^2$ is an alkyl group optionally substituted by halogen atoms or cyano groups or an alkoxy-substituted alkyl group;

(b) from 3 to 100 parts by weight of a reinforcing filler having a specific surface area of at least 10 $m^2/g$; and (c) from 0.6 to 15 parts by weight of an organopolysiloxane compound represented by the general formula $$R^3{-}SiR^4_2{-}({-}O{-}SiR^4_2{-})_n{-}R^3, \quad (2)$$

in which $R^3$ is an alkyl group or a hydroxy group, $R^4$ is a monovalent hydrocarbon group and the subscript n is a positive integer of 2 or larger, from 5.0% to 50.0% in number of the groups denoted by $R^4$ in a molecule being phenyl groups.

In a second embodiment of the present invention, the acrylic rubber composition comprises, as a uniform blend:

(a1) 100 parts by weight of an organosilicon-modified acrylic rubbery polymer which is a copolymer of a (meth)acrylic acid ester of the above given general formula (1) and an organosilicon compound having, in a molecule, at least one vinylsilyl group of the formula $CH_2{=}CH{-}Si{-}$;

(b) from 3 to 100 parts by weight of a reinforcing filler having a specific surface area of at least 10 $m^2/g$; and (c) from 0.6 to 15 parts by weight of an organopolysiloxane compound represented by the general formula $$R^3{-}SiR^4_2{-}({-}O{-}SiR^4_2{-})_n{-}R^3, \quad (2)$$

in which each symbol has the same meaning as defined above.

DETAILED DESCRIPTION OF THE PREFERRED EMBODIMENTS

In each of the first and second embodiments of the invention, the essential ingredients in the inventive acrylic rubber composition include the component (a) or (a1), component (b) and component (c), of which the most characteristic ingredient is the component (c) which is a very specific organopolysiloxane represented by the general formula (2).

In the first embodiment of the invention, the component (a) is an acrylic rubbery polymer which is a homopolymer of one kind or copolymer of two kinds or more of (meth)acrylic acid esters represented by the general formula $$CH_2{=}CR^1{-}CO{-}O{-}R^2, \quad (1)$$

in which $R^1$ is a hydrogen atom or a methyl group and $R^2$ is an alkyl group optionally substituted by halogen atoms or cyano groups or an alkoxy-substituted alkyl group. Examples of suitable (meth)acrylic acid esters include methyl acrylate, ethyl acrylate, tert-butyl acrylate, methyl methacrylate and ethyl methacrylate. Such an acrylic rubbery polymer is available as a commercial product including those sold under the trade names of Noxtites A-1075 and PA-212 (each a product by Nippon Oil Seal Kogyo Co.), Toaacron AR-801 (a product by Toa Paint Co.) and the like.

On the other hand, the component (al) used in the second embodiment of the invention is an acrylic rubbery polymer modified with an organosilicon group. Such a modified acrylic rubbery polymer can be prepared by the copolymerization of, preferably, from 90.0 to 99.9% by moles or, more preferably, from 98 to 99.5% by moles of a (meth)acrylic acid ester of the general formula (1) with, preferably, from 10.0 to 0.1% by moles or, more preferably, from 2 to 0.5% by moles of an organosilicon-modified acrylic monomer represented by the general formula $$CH_2{=}CR^1{-}CO{-}O{-}R^5, \quad (3)$$

in which $R^1$ is a hydrogen atom or a methyl group and $R^5$ is a monovalent hydrocarbon group or an alkyl group substituted by an organosilyl group having at least one silicon-bonded vinyl group in a molecule. Examples of the organosilyl group having at least one silicon-bonded vinyl group include those expressed by the following formulae, in which Me is a methyl group and Vi is a vinyl group:

$Vi-SiMe_2-CH_2-$;

$Vi-SiMe_2-O-SiMe_2-CH_2-$;

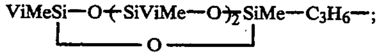

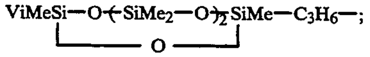

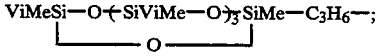

and

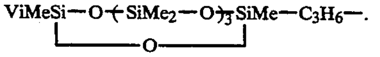

Japanese Patent Publication No. 62-40380 discloses such an acrylic rubbery polymer modified with a vinylsilyl-containing organic group. Further, modified acrylic rubbery polymers suitable as the component (al) in the invention are available as a commercial product including those sold under the trade names of RV-2520, RV-2540 and RV-2560 (each a product by Nissin Chemical Industry Co.). Alternatively, organosilyl-modified acrylic rubbery polymer suitable as the component (a1) can be obtained by the copolymerization of a (meth)acrylic acid ester of the general formula (1), a polyenic copolymerizable monomer having at least two ethylenically unsaturated linkages in a molecule and an ethylenically unsaturated monomeric compound having at least one organosilyl group having no silicon-bonded vinyl group.

The component (b) in the inventive rubber composition is a reinforcing filler. It is essential that the specific surface area of the filler is at least 10 $m^2/g$ in order that a good reinforcing effect can be obtained although effects other than reinforcement can be obtained thereby such as thickening, workability improvement and volume extension. Examples of suitable reinforcing fillers include carbon black, fumed silica filler, precipitated silica filler, quartz powder, diatomaceous earth and the like. The amount of the reinforcing filler as the component (b) in the inventive rubber composition is in the range from 3 to 100 parts by weight or, preferably, from 10 to 60 parts by weight per 100 parts by weight of the acrylic rubbery polymer as the component (a) or (a1). When the amount of the reinforcing filler is too small, no full reinforcing effect of the composition can be obtained along with the disadvantage of poor workability. When the amount of the reinforcing filler is too large, on the other hand, a great decrease is caused in the processability and moldability of the acrylic rubber composition.

The component (c), which is the most characteristic ingredient in the inventive rubber composition, is a diorganopolysiloxane represented by the above given general formula (2) and serves to plasticize the acrylic rubbery polymer as the component (a) or (a1). In addition, the diorganopolysiloxane has an effect of preventing sticking of the molded and vulcanized rubber article to the surface of a metallic body with which the article is kept in contact at an elevated temperature because the diorganopolysiloxane can bleed at an adequate rate on to the surface of the molded and vulcanized rubber article.

In the general formula (2), it is essential that from 5.0 to 50% in number of the groups denoted by $R^4$ in a molecule are phenyl groups. When the content of phenyl groups is too low, the diorganopolysiloxane cannot exhibit the full effect of sticking prevention. The upper limit of 50% in the content of phenyl groups in the diorganopolysiloxane is given by the fact that a diorganopolysiloxane of which the content of the phenyl groups exceeds 50% can be synthesized only with great difficulties in a conventional process. Further, the subscript n in the general formula (2) is a positive integer of 2 or larger so that the diorganopolysiloxane has at least three silicon atoms in a molecule. This is because a disiloxane compound, of which the subscript n in the general formula (2) is equal to 1, or a silane compound, of which the subscript n in the general formula (2) is equal to 0, has high vaporizability so that a large portion thereof would be lost from the composition during the molding and vulcanization process. Preferably, the subscript n in the general formula (2) is a positive integer in the range from 2 to 100 or, more preferably, from 3 to 20 since, when the value of n is too large, for example, in excess of 100, the diorganopolysiloxane as the component (c) is poorly bleedable on the surface of the molded and vulcanized rubber article and thus will not exhibit good sticking-preventing effect. Although it is desirable that the diorganopolysiloxane as the component (c) has a linear molecular structure, a small amount of branched chains may have no particularly adverse influences.

Examples of the diorganopolysiloxane suitable as the component (c) include those expressed by the following formulae, in which Me is a methyl group and Ph is a phenyl group:

$Me_3Si-(-O-SiPh_2-)-(-O-SiMe_2-)_{1-0}-O-SiMea_3$;

$Me_3Si-(-O-SiPh_2-)_2-(-O-SiMe_2-)_4-O-SiMe_3$; and $HO-SiMe_2-(-O-SiPh_2-)_2-(-O-SiMe_2-)_6-O-SiMe_3$.

The amount of the component (c) in the inventive rubber composition is in the range from 0.5 to 15 parts by weight or, preferably, from 3.0 to 7.0 parts by weight per 100 parts by weight of the acrylic rubbery polymer as the component (a) or (a1). When the amount of the component (c) is too small, no full effect of sticking prevention can be obtained of the molded and vulcanized rubber article due to insufficient bleeding of the diorganopolysiloxane on the surface while, when the amount thereof is too large, adverse influences are caused in the rubbery properties of the molded and vulcanized rubber article of the composition.

Besides the above described essential ingredients, i.e. components (a) or (a1), (b) and (c), it is of course possible that the inventive rubber composition can be admixed according to need with various kinds of known additives conventionally used in rubber compositions including processability improvers in roll milling such as higher fatty acids, e.g., stearic acid, dispersion aids for the fillers such as low molecular-weight dimethylpolysiloxanes having 100 or less of silicon atoms in a molecule and terminated at each molecular chain end with a silanol group, silanol compounds and alkoxy silane compounds, plasticizers to control the plasticity of the rubber composition, aging retarders and the like each in a limited amount.

Further, it is essential that a means for the vulcanization or curing of the rubber composition is provided in order for the rubber composition to be converted into a vulcanized rubber article. Although the inventive rubber composition can be vulcanized by irradiation with actinic rays, it is more convenient in most cases that the rubber composition is compounded with a vulcanizing agent. For example, sulfur can be a vulcanizing agent in the rubber composition according to the first embodiment of the invention while the rubber composition according to the second embodiment of the invention comprising the component (al) which is a copolymer of monomers including the acrylic monomer represented by the general formula (3) can be compounded either with sulfur or with an organic peroxide compound as the vulcanizing agent.

When vulcanization of the rubber composition with sulfur is desired, although any vulcanizing agent conventionally used for the vulcanization of acrylic rubber compositions can be used here, the sulfurous vulcanizing agent can be a combination of sulfur or a sulfur-donating compound and an alkali carboxylate, di- or tri-thiol-s-triazine compound, ammonium carboxylate, polyamine and the like When the vulcanizing agent is a combination of sulfur or a sulfur-donating compound and an alkali carboxylate, further improved vulcanization behavior and stability of processing can be ensured by compounding the composition with an N-substituted mono- or dimaleimide compound, urea or a urea derivative, thiourea or a thiourea derivative, imidazoline compound, amino acid and the like. Further, similar improvements can be obtained when the vulcanizing agent is a di- or trithiol-s-triazine compound by compounding the composition with a dithiocarbamate compound, 2,2-dithiobisbenzothiazole, alkali or alkaline earth carboxylate and the like according to a known procedure. The amount of the sulfurous vulcanizing agent in the inventive rubber composition is in the range from 0.5 to 10 parts by weight or, preferably, from 1 to 5 parts by weight per 100 parts by weight of the rubbery polymer as the component (a) or (a1).

The organic peroxide as a vulcanizing agent for the inventive rubber composition according to the second embodiment is not particularly limitative and can be any of conventional organic peroxides used as a vulcanizing agent of rubber compositions. Examples of suitable organic peroxides include dibenzoyl peroxide, bis(2,4-dichlorobenzoyl) peroxide, di-tert-butyl peroxide, 2,5-dimethyl-di-tert-butylperoxy hexane, tert-butyl perbenzoate, tert-butylperoxy isopropyl carbonate, dicumyl peroxide and the like. These organic peroxides can be used either singly or as a combination of two kinds or more according to need. The amount of the organic peroxide as a vulcanizing agent in the inventive rubber composition is in the range from 0.01 to 3 parts by weight or, preferably, from 0.05 to 1 part by weight per 100 parts by weight of the acrylic rubbery polymer as the component (a1). When adequately compounded with an organic peroxide, the inventive rubber composition can be fully vulcanized by heating for 1 minute to 5 hours at a temperature in the range from 100° to 400° C .to be converted into a cured or vulcanized rubber article.

In the following, the inventive acrylic rubber composition is illustrated in more detail by way of examples which, however, never limit the scope of the invention in any way. In the examples and comparative examples given below, the term of "parts" always refers to "parts by weight".

EXAMPLE 1

Each 50 parts of two kinds of acrylic rubbery polymers modified with vinylsilyl group-containing organic groups and having Mooney viscosities of 35 and 25, respectively, (RV-2540 and RV2560 *supra*) in combination were uniformly compounded with 65 parts of a reinforcing carbon black (HAF #70, a product by Asahi Carbon Co.), 10 parts of a process oil (RS 700, a product by Adeka Argus Chemical Co.), 2 parts of an amine-based aging retarder (Nocrack 445, a product by Uniroyal Co.), 2 parts of a dispersion aid (Lunac S-20, a product by Kao Co.), 1 part of Surfinol 440 (a product by Nissin Chemical Industry Co.) and 0.05 part of N-nitroso diphenyl amine followed by further admixture of 6 parts of a phenyl group-containing diorganopolysiloxane having a structure expressed by the general formula (2) given above, in which $R^3$ was a methyl group, 25% in number of the groups denoted by $R^4$were phenyl groups, the remainder of $R^4$ being methyl groups, and the subscript n was 15, and 1.3 parts of an organic peroxide (Perhexa 3M, a product by Nippon Oil & Fat Co.). The workability in roll milling of the composition was excellent.

The thus prepared acrylic rubber composition was first presscured at 155° C. for 10 minutes under compression followed by post-curing in a hot-air oven at 180° C. for 4 hours to give a vulcanized rubber sheet. The moldability of the composition was excellent. The vulcanized rubber sheets were subjected to the measurements of the mechanical properties to give the results shown in Table 1 below. The surface of the vulcanized rubber sheets was examined by a finger-touch test after 24 hours from vulcanization to find, though very slight, bleeding of an oily matter on the surface.

The mechanical properties of the rubber sheets were measured also after aging for 120 hours at 180° C. or after immersion in a No. 3 oil for 70 hours at 150° C. and the increments (+) or decrements (−) in % in the values of the respective properties are also shown in Table 1. The increment and decrement in the hardness values are shown by the difference of the hardness values.

The vulcanized rubber sheet as vulcanized having a thickness of 2 mm was sandwiched between two plates of cast iron having a well polished surface and kept at 180° C. for 136 hours as sandwiched with 25% compression by clamping of the cast iron plates. After cooling to room temperature, the cast iron plates were removed from the rubber sheet and the state of sticking therebetween was examined to find absolutely no sticking on all over the surface.

EXAMPLE 2

The experimental procedure was substantially the same as in Example 1 excepting an increase of the amount of the phenyl group-containing diorganopolysiloxane from 6 parts to 12 parts. The workability was excellent in roll milling and in vulcanization.

The mechanical properties of the vulcanized rubber sheets either as vulcanized or after the aging or oil-immersion test are shown in Table 1. Slight bleeding of an oily matter was detected by the finger-touch test on the surface of the rubber sheet after 24 hours from vulcanization. Absolutely no sticking was found to the surface of cast iron plates in the sticking test.

EXAMPLE 3

One hundred parts of an acrylic rubbery polymer (Toaacron AR-80, *supra*) were uniformly blended with 65 parts of the same reinforcing carbon black as used in Example 1, 1 part of a dispersion aid (Lunac S-20, *supra*), 2 parts of an aging retarder (Nouguard 445, *supra*), 0.3 part of a processing aid (Nonsaal SK-1, a product by Nippon Oil & Fat Co.) and 3 parts of another processing aid (Nonsaal SN-1, a product by Nippon Oil & Fat Co.) followed by further admixture of 6 parts of the same phenyl group-containing diorganopolysiloxane as used in Example 1 and 0.3 part of a fine powder of sulfur as a vulcanizing agent. The workability in roll milling was excellent.

The thus prepared acrylic rubber composition was subjected to the vulcanization and evaluation tests in just the same manner as in Example 1 to give the results shown in Table 1. The workability in vulcanization was excellent. Bleeding of an oily matter, though very slight, was detected on the surface of the vulcanized rubber sheet after 24 hours from vulcanization. No sticking of the rubber surface to the cast iron plates was found on all over the surface by the sticking test.

Comparative Example 1

The experimental procedure was substantially the same as in Example 1 excepting for the omission of the phenyl group-containing diorganopolysiloxane. The results obtained in the measurements of the mechanical properties are shown in Table 1. The workability in roller milling and vulcanization was somewhat inferior as compared with Example 1. Absolutely no bleeding of an oily matter was detected on the surface of the vulcanized rubber sheet after 24 hours from vulcanization. Sticking of the rubber surface to the cast iron plates was found spot-wise on the surface.

Comparative Example 2

The experimental procedure was substantially the same as in Example 3 excepting for the omission of the phenyl group-containing diorganopolysiloxane. The results obtained in the measurements of the mechanical properties are shown in Table 1. The workability in roller milling and vulcanization was somewhat inferior as compared with Example 3. Absolutely no bleeding of an oily matter was detected on the surface of the vulcanized rubber sheet after 24 hours from vulcanization. Sticking of the rubber surface to the cast iron plates was found spot-wise on the surface in the sticking test.

TABLE 1

| | Example | | | Comparative Example | |
|---|---|---|---|---|---|
| | 1 | 2 | 3 | 1 | 2 |
| As vulcanized | | | | | |
| Sp. gravity | 1.27 | 1.256 | 1.27 | 1.28 | 1.28 |
| Hardness, JIS A | 57 | 48 | 60 | 62 | 68 |
| Tensile strength, kg · cm$^2$ | 69 | 56 | 110 | 90 | 150 |
| Ultimate elongation,.% | 210 | 230 | 300 | 220 | 380 |
| Tear strength, kg/cm | 17 | 18 | 35 | 25 | 44 |
| Permanent compression set, %, | | | | | |
| after 22 hours at 150° C. | 20 | 18 | 18 | 15 | 17 |
| after 70 hours at 150° C. | 32 | 33 | 36 | 31 | 35 |
| Increment after aging | | | | | |
| Hardness | +16 | +18 | | +15 | |
| Tensile strength, % | −18 | −23 | | −16 | |
| Ultimate elongation, % | −14 | −14 | | −22 | |
| Weight, % | −5.01 | −4.98 | | −5.15 | |
| Increment after oil immersion | | | | | |
| Hardness | −10 | −5 | | −14 | |
| Tensile strength, % | −16 | −18 | | −19 | |
| Ultimate elongation, % | ±0 | −8 | | +4 | |
| Weight, % | +16.0 | +10.9 | | +19.6 | |
| Volume, % | +20.1 | +17.4 | | +27.3 | |

What is claimed is:

1. An acxrylic rubber composition which comprises, as a uniform blend:

(a) 100 parts by weight of an organosilicon-modified acrylic rubbery polymer which is a copolymer of a (meth)acrylic acid ester represented by the formula:

$$CH_2{=}CR^1{-}CO{-}O{-}R^2,$$

in which $R^1$ is a hydrogen atom or a methyl group and $R^2$ is an alkyl group or an alkoxy-substituted alkyl group, and an organosilicon compound having, in a molecule, at least one vinylsilyl group of the formula $CH_2{=}CH{-}Si{-}$;

(b) from 3 to 100 parts by weight of a reinforcing filler having a specific surface are of at least 10 $m^2/g$; and (c) from 0.6 to 15 parts by weight of an organopolysiloxane compound represented by the formula:

$$R^3{-}SiR^4_2{-}({-}O{-}SiR^4_2{-})_n{-}R^3,$$

in which $R^3$ is an alkyl group or a hydroxy group, $R^4$ is a monovalent hydrocarbon group and the subscript n is a positive integer of 2 or larger, from 5.0% to 50.0% in number of the groupss denoted by $R^4$ in a molecule being phenyl groups.

2. The acrylic rubber composition as claimed in claim 1 in which the amount of the component (c) is in the range from 3.0 to 7.0 parts by weight per 100 parts by weight of the component (a) (a).

3. The acrylic rubber composition of claim 1, wherein the reinforcing filler (b) is in an amount of 10 to 60 parts by weight per 100 parts by weight of the acrylic rubbery polymer, (a) (a).

4. The acrylic rubber composition of claim 1, wherein in the formula for the organopolysiloxane, (c), n is 2-100.

5. The acrylic rubber composition of claim 1, wherein the organopolysiloxane compound, (c), is a compound of one of the following formulae:

$Me_3Si—(—O—SiPh_2—)—(—O—SiMe_2—)_{10}—O—SiMe_3$;

$Me_3Si—(—O—SiPh_2—)_2—(—O—SiMe_2—)_4—O—SiMe_3$; and $HO—SiMe_2—(—O—SiPh_2—)_2—(—O—SiMe_2—)_6—O—SiMe_3$.

6. The acrylic rubber composition of claim 1, wherein the organopolysiloxane compound (c) is present in an amount of 3.0 to 7.0 parts by weight per 100 parts by weight of the àcrylic rubbery polymer, (a) (a).

7. The acrylic rubber composition of claim 1, further comprising 0.5 to 10 parts by weight of a sulfurous vulcanizing agent.

8. The acrylic rubber composition of claim 7, wherein the sulfurous vulcanizing agent comprises sulfur or a sulfur-donating compound and an alkali carboxylate, di- or tri-thiol-s-triazine compound, ammonium carboxylate or polyamine.

* * * * *

UNITED STATES PATENT AND TRADEMARK OFFICE

CERTIFICATE OF CORRECTION

PATENT NO. : 5,405,908

DATED : April 11, 1995

INVENTOR(S) : TAKAHASHI et al.

It is certified that error appears in the above-indentified patent and that said Letters Patent is hereby corrected as shown below:

Claim 3; column 9, line 4: Delete "(a)" second occurance.

Claim 6; column 10, line 7: Delete "(a)" second occurance.

Signed and Sealed this

Seventeenth Day of October, 1995

Attest:

BRUCE LEHMAN

*Attesting Officer* *Commissioner of Patents and Trademarks*